US005206670A

United States Patent [19]

Nishikawa

[11] Patent Number: 5,206,670

[45] Date of Patent: Apr. 27, 1993

[54] ION CURRENT CONTROL HEAD

[75] Inventor: Masaji Nishikawa, Tokyo, Japan

[73] Assignee: Olympus Optical Co., Ltd., Tokyo, Japan

[21] Appl. No.: 793,617

[22] Filed: Nov. 18, 1991

[30] Foreign Application Priority Data

Nov. 28, 1990 [JP] Japan ................................ 2-328334

[51] Int. Cl.[5] ........................................ G01D 15/06

[52] U.S. Cl. ................................................ 346/159

[58] Field of Search ...................................... 346/159

[56] References Cited

U.S. PATENT DOCUMENTS

| | | | |
|---|---|---|---|
| 4,320,408 | 3/1982 | Iwasa et al. | 346/159 |
| 4,426,654 | 1/1984 | Tarumi et al. | 346/159 |
| 4,675,703 | 6/1987 | Fotland | 346/159 |
| 5,068,961 | 12/1991 | Nishikawa | 346/159 X |

FOREIGN PATENT DOCUMENTS

| | | |
|---|---|---|
| 59-43317 | 10/1984 | Japan . |
| 61-8424 | 3/1986 | Japan . |

*Primary Examiner*—George H. Miller, Jr.
*Attorney, Agent, or Firm*—Frishauf, Holtz, Goodman & Woodward

[57] ABSTRACT

In an ion current control head for controlling ion current flying from an ion generation source to a dielectric medium, an electrode and electrode are each divided into a plurality of segment electrode areas, the segment electrode areas in one of these electrodes intersect those in the other electrode, and an undivided continuous electrode is provided on an ion generation source side as viewed from the electrodes. At those intersections of the segment electrode areas in the electrode and those in the second electrode, openings are provided which pierce the electrodes. An ion current control matrix drive is carried out by applying a control signal voltage across the electrodes for controlling whether ion current is flowed in the opening lor suppressed and a control signal voltage across the electrodes for controlling whether the passage of the ion current in the opening is allowed or suppressed.

4 Claims, 8 Drawing Sheets

ION CURRENT CONTROL HEAD

BACKGROUND OF THE INVENTION

1. Field of the Invention

The present invention relates to an ion current control head for flying ions from an ion generation source and controlling, by a three-layered electrode structure, ion current to be passed through a corresponding ion passage opening provided in an ion flying path.

2. Description of the Related Art

Published Examined Japanese Patent Application 61-8424 discloses an electrostatic recording system using this type of an ion current control head. FIGS. 9, 10A and 10B show an ion current control head cited from the above Japanese Patent Application. FIG. 9 is a cross-sectional view showing an arrangement of the ion current control head. The ion current head has a first matrix electrode 5c and second matrix electrode 5e. FIG. 10 A shows a planer arrangement showing segment electrode areas in the second matrix electrode 5c. An undivided continuous electrode (screen electrode) layer is arranged, as a reference electrode 5d, between the first matrix electrode 5c and the second matrix electrode 5e. The electrodes 5c, 5e and 5d provide a three-layered structure with an insulating layer 5a provided between the electrodes 5c and 5d and an pinsulating layer 5b provided between the electrodes 5d and 5e.

As shown in FIGS. 10A and 10B, the matrix electrode 5c has its own segment electrode areas arranged in a direction intersecting the segment electrode areas of the matrix electrode 5e. Openings $6_{11}$, $6_{12}$, . . . ; $6_{21}$, $6_{22}$, . . . , . . . are provided at those intersections of the segment electrode areas of these matrix electrodes to allow the passage and control of ion current. These openings $6_{11}$, $6_{12}$, . . . ; $6_{21}$, $6_{22}$, . . . ; . . . are arranged in a two-dimensional matrix array.

A signal corresponding to a recording image is applied across the electrode 5d and the matrix electrodes 5c and 5e to control ion current trying to pass through the control openings $6_{11}$, $6_{12}$, . . . ; $6_{21}$, $6_{22}$, . . . ; . . . in which case the ion current is supplied from a common ion generation source. That is, with the electrode 5d as a reference, a control signal voltage is selectively applied to the first matrix electrode 5c to control whether or not the ion current is trapped in the openings $6_{11}$, $6_{12}$, . . . ; $6_{21}$, $6_{22}$, . . . ; . . . . With the electrode 5d as the reference, a control signal voltage is selectively applied to the second matrix electrode 5e to control whether or not to pass ion current through the control openings $6_{11}$, $6_{12}$, . . . ; $6_{21}$, $6_{22}$, . . . ; . . . .

Thus the ion current can be controlled by the respective matrix electrodes 5c, 5e in a matrix drive mode and hence can be so done, by less number of driver circuits, relative to the larger number of control openings $6_{11}$, $6_{12}$, . . . ; $6_{21}$, $6_{22}$, . . . ; . . . .

In the ion current control head disclosed in the above Japanese Patent Application 61-8424 and a similar ion current control head for controlling ion current by two electrode layers of a matrix array, that electrode facing an ion generation source is comprised of a plurality of segment electrode areas $5c_1$, $5c_2$, $5c_3$, $5c_4$, . . . . In the case where a signal voltage acting to allow the ion current which comes from the ion generation source to pass through a corresponding opening and a control signal acting to allow that ion current to be suppressed relative to the other openings are supplied respectively to one segment electrode area facing the ion generation source and to the other segment areas, a potential difference between the corresponding opening and an adjacent opening exerts a greater-adverse influence on an electric field of the electrode surface involved and hence the corresponding ion current to be trapped in a predetermined opening is decreased due to an adverse influence exerted by the adjacent segment electrode area acting to suppress the ion current. It is, therefore, not possible to trap an adequate amount of electric current in the corresponding opening.

This operation will be explained below with reference to FIG. 11.

Let it be assumed that ion current passes through one opening $6_{21}$ only and it is suppressed relative to the adjacent openings $6_{11}$ and $6_{31}$. Here, it is assumed that the ion current is a negative ion.

In order to trap an ion current in the opening $6_{21}$, a negative voltage of, for example, $-150$V is applied to the segment electrode area $5c_2$ with an undivided continuous electrode 5d as a reference. To the adjacent segment electrode areas $5c_1$ and $5c_3$ a positive voltage of, for example, $+100$V is applied, suppressing the passage of the ion current through the openings $6_{11}$ and $6_{31}$. Under this condition, an equipotential plane E1 is created in a space on the ion generation source side. FIG. 11 is a cross-sectional view showing the equipotential plane E1. The equipotential E1 provides a convex lens-like potential plane above the opening $6_{21}$ and electric lines of force created in a direction perpendicular to the convex lens-like equipotential plane are passed through the opening $6_{21}$ as narrower lines, that is, through the central area of the opening $6_{21}$.

Further, the equipotential line suffers an electric influence by the adjacent segment electrode area $5c_1$ and $5c_3$ as it goes away from the central area of the opening $6_{21}$. Viewed from these segment electrode areas $5c_1$, $5c_2$ and $5c_3$ throughout, a concave lens-like equipotential plane E2 is formed with the segment electrode area $5c_2$ as a reference. The electric lines of force spaced apart from the central area of the opening $6_{21}$ undergo an action by the concave lens-like potential plane as indicated by solid arrows in FIG. 11 and an appreciable portion of such lines of force goes toward the segment electrode areas $5c_1$ and $5c_3$ and only a portion of the lines of force near the central area of the opening $6_{21}$ is trapped in the opening $6_{21}$.

The equipotential line E3 upon the application of a voltage to the respective segment electrode areas $5c_1$, $5c_2$ and $5c_3$ to allow a flow of ion current though the openings $6_{11}$, $6_{21}$ and $6_{31}$, respectively, is as indicated by dotted lines in FIG. 11. In this case, the equipotential line E3 is regularly undulated with a convex lens-like wave created over each of the openings $6_{11}$, $6_{21}$ and $6_{31}$ and the ion current produces no action of displacement in any particular directions throughout a zone of the respective segment electrode areas $5c_1$, $5c_2$ and $5c_3$. As a result, ion current maximally trappable in the opening $6_{21}$ is more broadly directed there as indicated by the dotted arrows in FIG. 11 than the case where it is suppressed by the adjacent segment electrode areas $5c_1$ and $5c_3$ due to the suppression potential involved.

Now let it be assumed that the segment electrode areas $5c_1$, $5c_2$ and $5c_3$ in the matrix electrode 5c are arranged with their openings 6, . . . sequentially provided in a main scanning direction as shown in FIG. 10A and the segment electrode areas $5c_1$, $5c_2$, $5c_3$ . . . in the electrode 5c are sequentially selected to allow ion current to be trapped in the corresponding openings. In this case, only a narrower ion current is trapped in the opening at all times as indicated by the solid arrows in FIG. 11.

In the case where the matrix electrode 5*e* is such that the openings $6_{11}$, $6_{12}$, . . . ; $6_{21}$, $6_{22}$, . . . are sequentially provided in a sub-scanning direction and an oblique direction as shown in FIG. 10B, an image signal voltage is simultaneously applied to the segment electrode areas $5c_1$, $5c_2$, $5c_3$ in the electrode 5*c*. In the case where, relative to only one opening, the segment electrode area is turned ON, the ion current is less flowed through the corresponding opening. In the case where the image signal voltage is simultaneously applied to a plurality of adjacent openings, more ion current flows through each opening.

Such an ion current control head is usually employed as a print head for printers. Depending upon the operation state in which the ion current is not properly directed, a high-speed printing head requiring more ion current cannot be realized or the printing concentration of the printer is lowered at an isolated dot type printing, such as a one-dot- or two-dot-at-a-time printing.

SUMMARY OF THE INVENTION

It is accordingly the object of the present invention to provide an ion current control head which can make control to trap more ion current in a corresponding opening or, even if ion current is to be trapped in one opening at a time, ensure better control characteristic whereby it is possible to prevent a lowering in that ion current to be flowed through the opening.

The object of the present invention can be achieved by an ion current control head.

In order to achieve the object of the present invention, an ion current control head is provided in which first and second electrodes and undivided continuous electrode are provided which are spaced apart, and supported by, insulating layers; the first and second electrodes are each divided into a plurality of band-like segment electrode areas such that the segment electrode areas in one of the first and second electrodes intersect those of the other electrode; at those intersections of the segment electrode area in the first electrode and segment electrode areas in the second electrode areas, ion current control openings are provided as a two-dimensional array such that they penetrate the third electrode; and the ion current to be passed through the respective opening is controlled by signal voltages each applied across the associated electrodes. In the ion current control head as set out above, the third electrode is undivided and continuous and located opposite to an ion generation source and a first signal voltage is applied across the third electrode and the first electrode for controlling whether the passage of the ion current through the ion current control opening or its suppression is made and a second signal voltage is applied across the first electrode and the second electrode for controlling whether the passage of the ion current trapped in the ion current control opening or its suppression is made, wherein a matrix drive is done, by these electrodes and signal voltages, for ion current control.

In the arrangement as set out above, when ion current originating from the ion generation source is to be trapped in the ion current control opening, even if the adjacent opening is not in an ion-trapped state, an ambient electric field around the opening where the ion current is to be trapped acts in a direction in which an amount of ion current to be trapped is increased.

In the arrangement as set out above, the respective electrodes are spaced apart, and supported, by the insulating layers and are such that larger openings are provided, as ion current control openings, in the third electrode facing the ion generation source and in its supporting insulating layer and smaller openings are provided, as ion current control openings, in the first and second electrodes and in their supporting insulating layer to achieve communication between each larger opening and the corresponding smaller opening.

According to the present invention, it is also possible to trap more ion current by increasing the size of the opening on the third electrode side while decreasing the size of the openings in the segment electrode areas. Further, it is possible to decrease an occupation space at the segment electrode areas and to increase an amount of ion current to be trapped in the opening without lowering a withstand voltage involved.

According to the present invention, adjacent the third electrode facing the ion generation source, the first electrode is provided which has its segment electrode areas arranged with the ion current control openings provided, as a two-dimensional matrix array, in each segment electrode area in a main scanning direction. Adjacent to the first electrode, the second electrode is provided which has its segment electrode areas arranged with the ion current control openings provided in each segment electrode area in a direction oblique to a sub-scanning direction. By so doing, the respective electrodes are supported by the insulating layers to provide an integral structure.

In the arrangement shown, the segment electrode area with the openings provided in the main scanning direction is selected one at a time and a voltage is applied to the corresponding opening in the selected segment electrode area and a voltage for repelling the ion current relative to the openings is applied to the other segment areas in the same electrode in the main scanning direction, allowing more current to be flowed into the opening in that selected electrode area.

According to the present invention, adjacent to the outermost openings in the third electrode facing the ion generation source, a pair of isolation electrodes are provided in the main scanning direction in a manner to be separated from the third electrode and a voltage of a polarity for repelling ion current with a potential on the third electrode as a reference is applied to the isolation electrode.

According to the present invention, when an outermost one of those segment electrode areas each with the openings provided in the main scanning direction is selected, then an ion repelling voltage applied to the adjacent segment electrode area acts toward allowing more current to flow into an opening in the selected outermost segment area and, at that time, the isolated electrode also acts in the same way so that more ion current can be flowed into the opening in the outermost segment area in the same way as the openings in the other segment electrode areas.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENT

A first embodiment of the present invention will be explained below with reference to FIGS. 1 to 3.

Figure 1A:
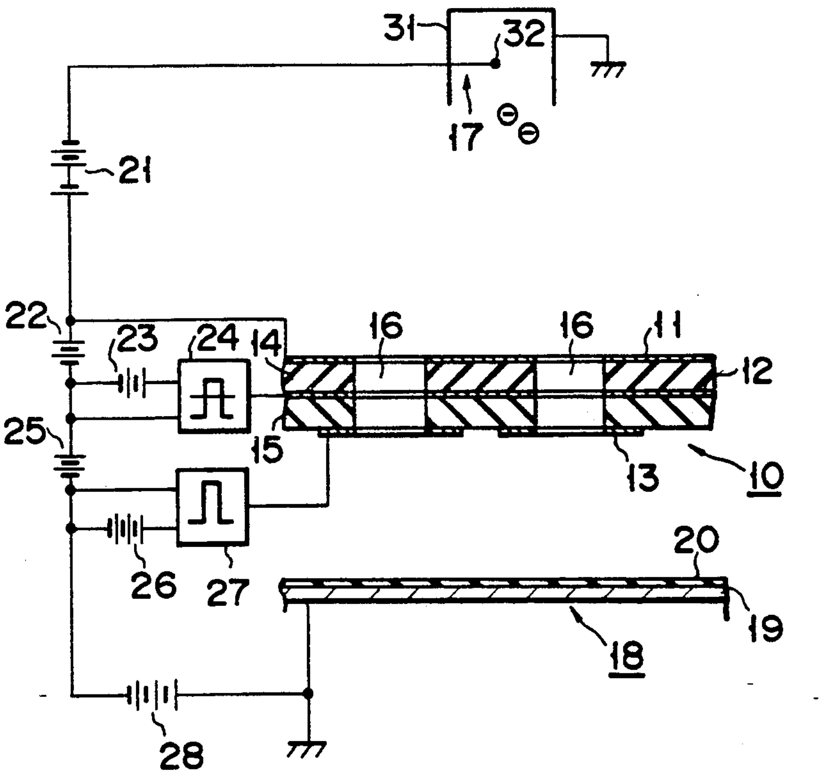
FIG. 1A is an explanative view schematically showing an electrostatic recording apparatus using an ion current control head according to a first embodiment of the present invention.
Figure 1B:
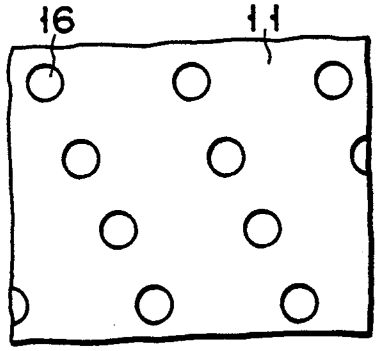
FIG. 1B is a plan view showing an electrode in the ion current control head in FIG. 1.
Figure 1C:
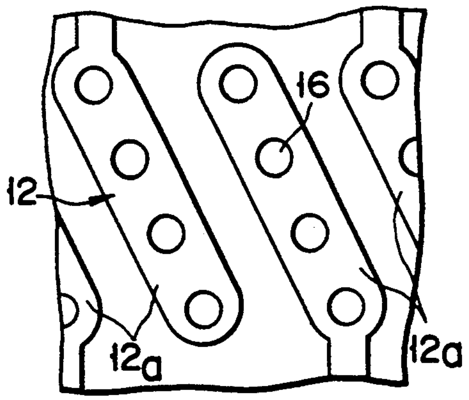
FIG. 1C is a plan view showing an arrangement of segment electrode areas in a first matrix electrode of the ion current control head in FIG. 1.
Figure 1D:
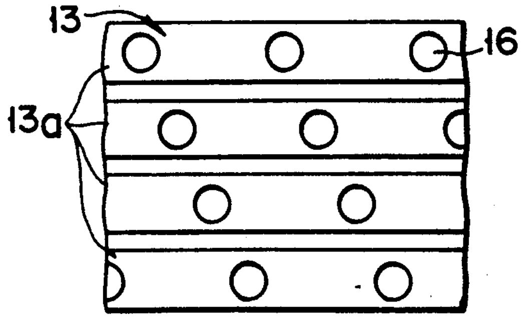
FIG. 1D is a plan view showing an arrangement of segment electrode areas in a second matrix electrode of the ion current control head in FIG. 1.

In FIG. 1A, reference numeral 10 shows an ion current control head having an undivided continuous electrode 11 (see FIG. 1B), first matrix electrode (finger electrode) 12 (see FIG. 1C) and second matrix electrode (line electrode) (see FIG. 1D). An insulating layer 14 is formed between the electrode 11 and the first matrix electrode 12 and another insulating layer is formed between the first matrix electrode 12 and the second matrix electrode 13. These electrodes provide an integral unit with each electrode isolated by the corresponding insulating layer. A larger number of ion current control openings 16 are formed in the ion current control head 10 as will be set forth below. In FIG. 1A, 17 and 18 show an ion generation source and recording medium, such as recording paper, respectively, the recording medium comprising a conduction-treated layer 19 and dielectric recording layer 20. The recording medium serves as an image carrier on which the electrostatic latent is formed. Reference numeral 21 shows a corona high-pressure power source; 22, a first suppression field power source; 23, a first acceleration field power source; 24, a switching circuit; 25, a second suppression field power source; 26, a second acceleration field source: 27, a switching circuit; and 28, a bias power source. These component parts provide a matrix drive means for ion current control.

The ion current control head 10 is so arranged that the electrode 11 faces the ion generation source 17, the first matrix electrode 12 is then located in place and the second matrix electrode 13 is located more on the record medium 18 side than the first matrix electrode 2. The electrode 11 is comprised of, for example, a metal sheet of uniform thickness. As shown in plan view in FIG. 1B, the electrode 11 has a plurality of ion current control openings 16 in a two-dimensional matrix array where the metal portions are removed.

The openings 16 are arranged, as a parallel linear array, at a predetermined interval in the main (right/left in FIG. 1B) scanning direction. The openings are arranged at a predetermined interval in a direction oblique or parallel to a sub-scanning direction, though being not restricted to a straight linear array.

The first matrix electrode 12 is comprised of a plurality of band (strip) layer-like conductive segment electrodes or areas 12*a*. The respective conductive segment patterns 12*a* is made continuous with an oblique array of openings 16 provided in the sub-scanning direction. The second matrix electrode 13 is comprised of a plurality of band (strip) layer-like conductive segment electrodes or areas 12*a*. The respective conductive segment patterns 12*a* is made continuous with a parallel linear array of openings 16 provided along the main scanning direction.

The conductive segment areas 12a in the first matrix electrode 12 intersect the conductive segment areas 12a in the second matrix electrode 13 in a plan view with the ion current control openings 16 each provided at the corresponding intersection. That is, the ion current control openings 16 are so formed as to have each control opening aligned with the corresponding opening in the electrodes 11, 12 and 13 and insulating layers 14 and 15.

As the ion generation source 17, a corotron structure is often employed in which a shielding electrode 31 surrounds a corona wire 32 on three sides. However, the shield electrode 31 may be basically omitted because it is possible to take a potential difference across the electrode 11 and the corona wire 32. The provision of the shield electrode 31 is effective to prevent dirt intrusion and to support the corona wire 32. In that case, a gap between the corona wire 32 and the shield electrode 31 is preferably made greater than that between the corona wire 32 and the electrode 11.

A control voltage for controlling whether or not to trap the ion current in the opening 16 is applied across the electrode 11 and the first matrix electrode 12. For this purpose, the power sources 22 and 23 and switching circuit 24 are provided as such components. The first suppression field power source 22 is used to apply a voltage across the electrode 11 and the first matrix electrode 12 and create an electric field for suppressing the passage of ion current through the opening 16. The first acceleration field power source 23 is adapted to apply a voltage across the electrode 11 and the first matrix electrode 12 to cancel an action by the first suppression field power source 22 and to trap the ion current, as much as possible, in the opening 16. This operation is performed by the switching circuit 24. The number of such switching circuits 24 is equal to that of the segment electrode areas 12a in the first matrix electrode 12. Any one of the power source (22, 23) voltages is applied to the first matrix electrode 12 for selective control.

Similarly, the second suppression field power source 25 is adapted to apply a voltage across the first matrix electrode 12 and the second matrix electrode 13 and absorb ion current trapped in the opening 16 so that the ion current is prevented from being flowed toward the recording medium. The second acceleration field power source 26 is adapted to apply a voltage across the first matrix electrode 12 and the second matrix electrode 13 and accelerate a flow of the ion current trapped in the opening 16 toward the recording medium 18. The control of the application voltage is performed by the switching circuit 27. The switching circuit 27 performs selective control as to which one of the power source (25, 26) voltages is applied across the first matrix electrode 12 and the second matrix electrode 13. The number of such switching circuits 27 is made equal to that of the segment electrode areas 12a in the second matrix electrode 13. The bias power source 28 applies such a bias voltage as to prevent the broadening of a shaped ion current or its unsteady variation in flight after it has been flowed toward the recording medium 18 past the ion current control head 10.

The ion current control operation relative to the ion current control opening 16 will be explained below with reference to FIGS. 2A to 2D.

For simplification in explanation, let it be assumed that a negative corona ion is to be controlled and that the voltage applied to the electrode 11, being often of the order to −1000V under a practical condition of use, is set to be at 0V for convenience in explanation on the control function of the ion current.

Figures 2A, 2B, 2C, 2D, 3:
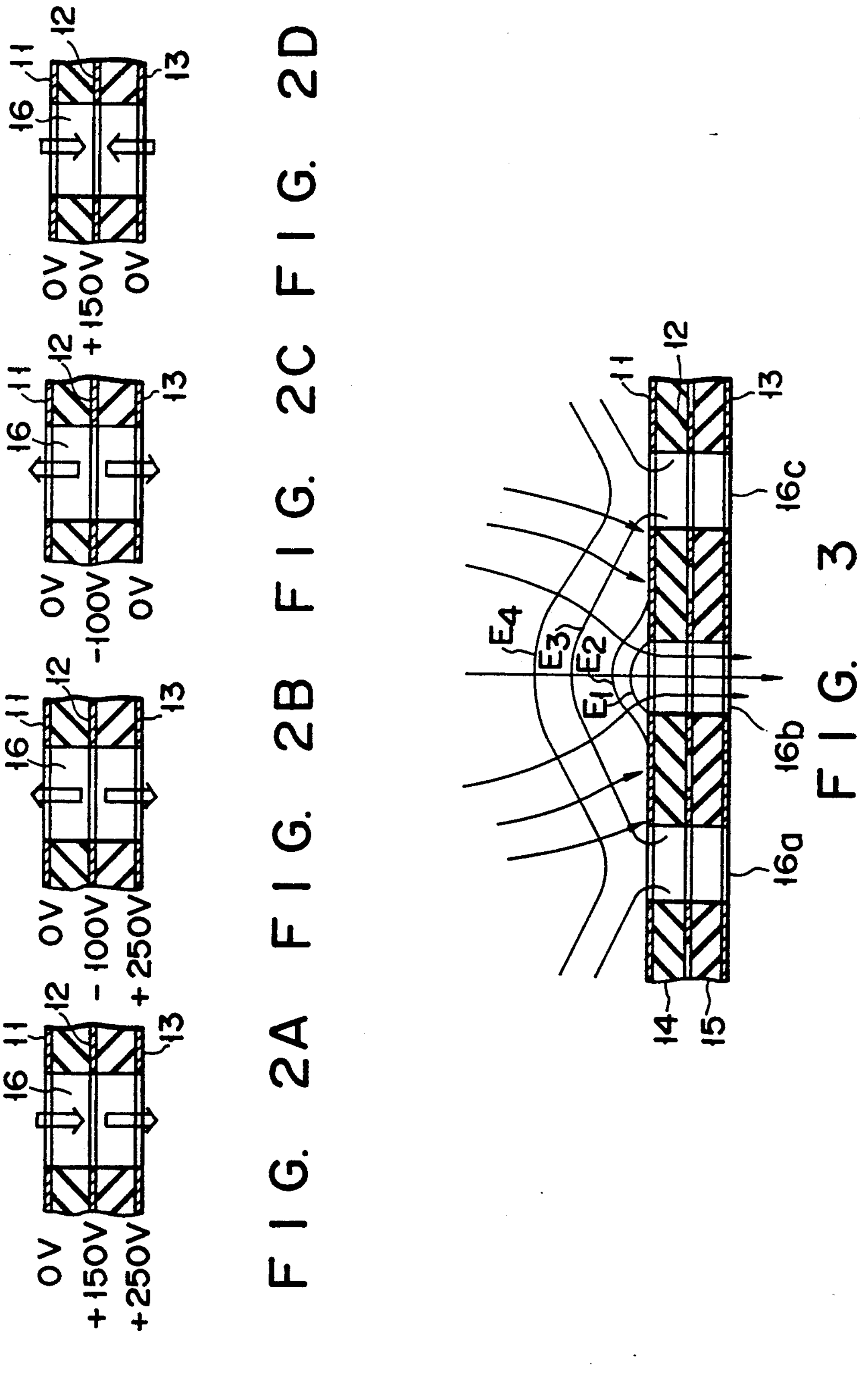
FIGS. 2A to 2D, each, are a longitudinal cross-sectional view showing the state of ion current when a control voltage is applied to respective electrodes of the ion current control head.
FIG. 3 is an explanative view showing the state of an electric field applied and ion current in the ion current control head in FIG. 1.
Figure 4A:
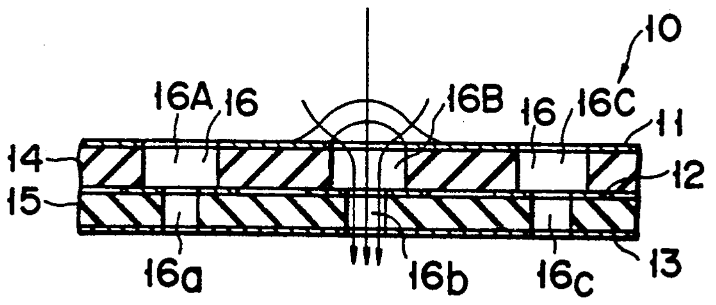
FIG. 4A is a longitudinal cross-section showing an ion current control head according to a second embodiment of the present invention.
Figure 4B:
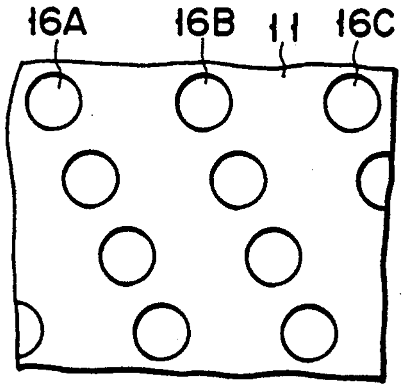
FIG. 4B is a plan view showing an electrode of the ion current control head in FIG. 4A.
Figure 4C:
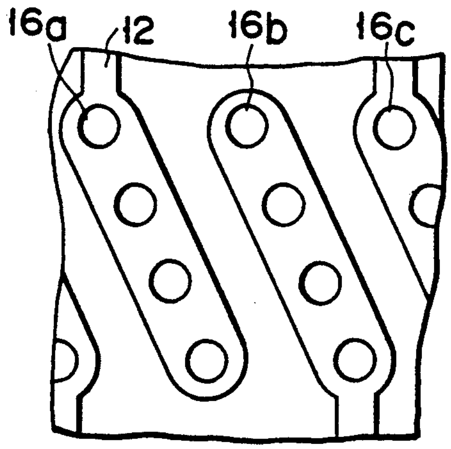
FIG. 4C is a plan view showing an arrangement of segment electrode areas in a first matrix electrode of the ion current control head in FIG. 4A.
Figure 4D:
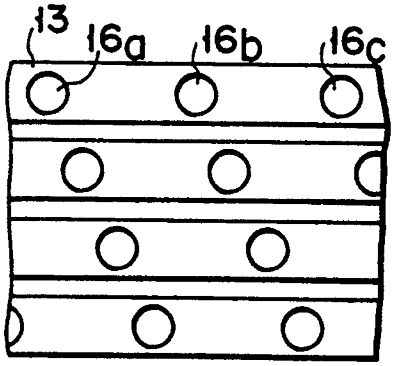
FIG. 4D is a plan view showing an arrangement of segment electrode areas in a second matrix electrode of the ion current control head in FIG. 4A.

(a) With +150V and +250V applied to the first matrix electrode 12 and second matrix electrode 13, respectively, as shown in FIG. 2A, a voltage is applied across the electrode 11 and the first matrix electrode 12 in a direction in which the passage of ion current through the control opening 16 is accelerated. Therefore, the ion current is trapped in the opening 16. Since a voltage across the first matrix electrode 12 and the second matrix electrode 13 acts in a direction in which the passage of the ion current through the opening is accelerated, the trapped ion current goes toward the recording medium 18 past the opening 16.

(b) With −100V and +250V applied to the first matrix electrode 12 and second matrix electrode 13, respectively, as shown in FIG. 2B, a voltage is applied across the electrode 11 and the first matrix electrode 12 in a direction in which the flow of the ion current into the opening 16 is suppressed. In this case, a voltage across the first matrix electrode 12 and the second matrix electrode 13 acts in a direction in which the passage of the ion current through the opening is accelerated, but the ion current is not flowed into the opening 16 since that acceleration action is cancelled. Thus the ion current is not flowed.

(c) With −100V and 0V applied to the first matrix electrode 12 and second matrix electrode 13, respectively, as shown in FIG. 2C, a voltage across the electrodes 11 and 12 acts in a direction in which the flow of the ion current through the passage 16 is suppressed. A voltage across the first matrix electrode 12 and the second matrix electrode 13, on the other hand, acts in a direction in which the passage of the ion current through the opening is allowed. However, the ion current does not enter the opening 16 due to the suppression action as set out above. Thus the ion current is not flowed through the opening 16.

(d) With +150V and 0V applied to the first matrix electrode 12 and second matrix electrode 13, respectively, as shown in FIG. 2D, the ion current is trapped in the opening 16 due to the action of a voltage across the electrode 11 and the first matrix electrode 12, but it is not flowed through the opening 16 due to the suppression action of that voltage across the first matrix electrode 12 and the second matrix electrode 13.

The above operation will be explained below in a different way.

First control is performed between the electrode 11 and the first matrix electrode 12 and it traps the ion current in the opening 16. By a voltage applied across the first matrix electrode 12 and the second matrix electrode 13, control is made as to whether or not the passage of the trapped ion current in the opening 16 is allowed. Thus the matrix control is performed by a signal voltage applied across the segment electrodes 12 and 13.

The operation effect by the resutant control will be explained below with reference to FIG. 3. FIG. 3 shows the same ion current control head 10 as shown in FIGS. 1A to 1D with the first matrix electrode 12 shown separated in different cross-section. In FIG. 3, 16b shows an opening corresponding to a segment electrode area in the first matrix electrode 12 supplied with a voltage for trapping the ion current and 16a, 16b show openings corresponding to different segment electrode areas in the first matrix electrode 12 supplied with a voltage for suppressing the passage of the ion current.

Applying a voltage to the first matrix electrode 12 creates convex lens-like equipotential planes E1, E2, E3 and E4 over the opening 16*b* and concave lens-like equipotential planes over the openings 16*a* and 16*b*.

Figure 11:
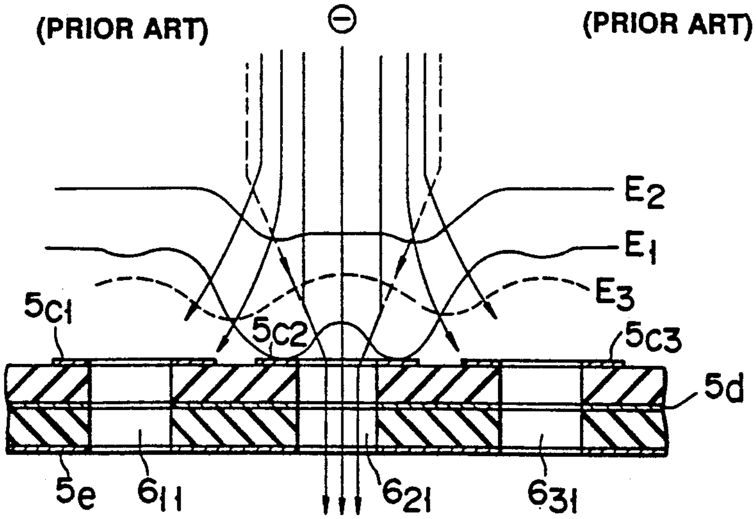
FIG. 11 (PRIOR ART)
FIG. 11 is a cross-sectional view showing the state of an electric field and ion current in the ion current control head.

In the conventional case as shown in Fins. 9 and 10, an equipotential line as shown in FIG. 11 is obtained from a divided electrode array facing the ion generation source side.

As evident from a comparison between the state shown in FIG. 11 and the state shown in FIG. 3, an electrode surface involved suffers a greater influence due to a potential difference relative to the adjacent openings as in the conventional case and a resultant convex lens-like equipotential plane is narrowly defined due to an action given by the adjacent opening. In the first embodiment of the present invention, on the other hand, a convex lens-like equipotential plane is greatly broadened, by the action of the convex lens-like plane over the adjacent areas, due to the electrode 11 being arranged on the ion generation source side. From this it will be seen that a broader ion current is trapped in the opening 16*b*.

According to the present invention, in the case where a voltage acting in a direction to suppress the entry of the ion current is applied relative to the adjacent opening 16, it serves to enable an opening 16 now considered to trap more ion current from a greater zone, thus achieving the object of the present invention.

In order to trap more ion current in the opening 16 as set out above, a greater acceleration voltage is applied across the electrode 11 and the first matrix electrode 12 and a convex lens-like equipotential plane is made greater through a converging action, but the ion current control opening 16, if being smaller in its physical dimension, would be restricted in an amount of ion current trapped there.

It may be considered that, in order to trap more ion current, the opening 16 is made greater in its diameter. Since, however, the openings in the conventional ion current control head are formed in the segmented electrode, if the size of the openings in the segmented electrode is so made greater, a narrower space is left between the segmented electrode areas and the withstand voltage across the segment electrode areas is liable to be lowered.

FIGS. 4A to 4D show a second embodiment of the present invention which can solve the aforementioned problem. An ion current control head of the second embodiment has an undivided continuous electrode 11, first matrix electrode 12, second matrix electrode 13 and insulating layers 14 and 15. Ion current control openings 16 are of such a type that larger openings 16A, 16B and 16C are connected to smaller openings 16*a*, 16*b* and 16*c* in a corresponding relation. The larger openings 16A, 16B and 16C are provided in the electrode 11 and insulating layer 14 on an ion generation source side. Since the electrode 11 is not segmented in spite of its larger openings 16A, 16B and 16C, no adverse influence is exerted on the withstand voltage, etc., of the electrode 11. Making the size of the openings on the ion generation source 17 side greater enables more ion current to be trapped from a broader zone.

The smaller openings 16*a*, 16*b* and 16*c* are provided in the matrix electrodes 12 and 13 and insulating layer 15, enabling a broader spacing to be provided between the segment electrode areas. It is, thus, possible to enhance a withstand voltage on the segment electrode areas. The smaller openings simply acts to control the acceleration and suppression of the passage of the ion current trapped. Since the ion current trapped becomes narrower in the smaller opening, it is not necessary to provide a larger-sized opening there. Rather, the smaller opening positively controls the ion current with a smaller voltage and proves advantageous.

In the respective embodiment as set out above, the first matrix electrode 12 has an array of segment electrode areas 12*a* with a series of openings 16 provided in each segment electrode area in a direction oblique to the sub-scanning direction. The second matrix electrode 13 has an array of segment electrode areas 12*a* with a series of openings provided in each segment electrode area in a direction parallel to the main scanning direction. An image signal is applied to the first matrix electrode 12 and the second matrix electrode 13 is so operated that one segment electrode area is sequentially selected at a time to enable the ion current to pass through the corresponding opening. In this way, matrix control is carried out.

Let it be assumed that, in the arrangement as set out above, all the openings 16 allow the passage of the ion current as in the case of a solid-black image. The first matrix electrode 12 has its respective segment electrode areas supplied with a voltage for trapping ion current in their corresponding openings 16, but, at each instant, the ion current is flowed out of only the corresponding opening 16 in the second matrix electrode 13.

In the case where more ion current is to be trapped in the respective opening 16, a maximally trappable ion amount corresponds to only that ion current from a zone equally allotted to each opening in the matrix array and it is not possible to utilize that ion current which is suppressed from being trapped in the corresponding opening 16.

It is, however, preferable to utilize more ion current beyond the limit set out above.

FIGS. 5A to 5D show a third embodiment of the present invention which can solve the aforementioned problem.

In the third embodiment, an ion current control head 10 has an undivided continuous electrode 11, first matrix electrode 12, second matrix electrode 13 and insulating layers 14 and 15 which are the same type as those shown in the preceding embodiment. In this ion current control head 10, a third electrode 11 faces the ion generation source 17 and a second electrode 13 is provided adjacent the third electrode 13 and has its segment electrode areas with a series of openings 16 provided at a two-dimensional matrix array in the corresponding segment electrode areas in a main scanning direction. A first electrode 12 is provided adjacent the second electrode 13 and has its segment electrodes with a series of openings 16 provided in a direction oblique to a sub-scanning direction.

Figure 5A:
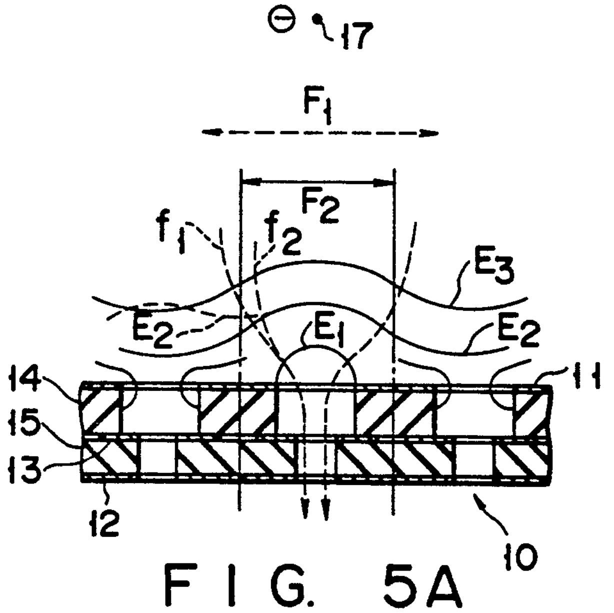
FIG. 5A is a longitudinal cross-section showing an ion current control head according to a third embodiment of the present invention.
Figure 5B:
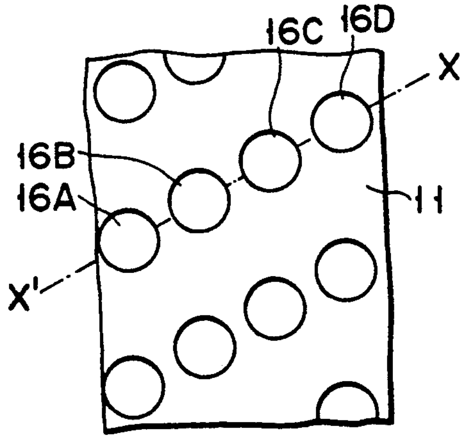
FIG. 5B is a plan view showing an electrode of the ion current control head in FIG. 5A.
Figure 5C:
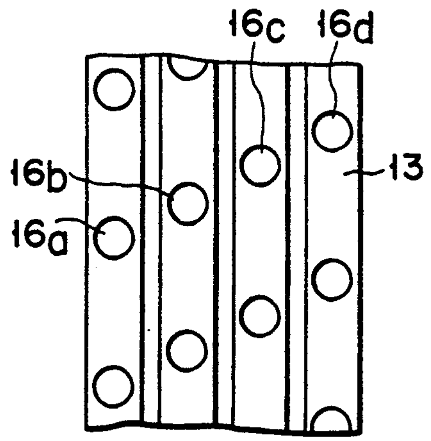
FIG. 5C is a plan view showing an arrangement of segment electrode areas in a second matrix electrode of the ion current control head of FIG. 5A.
Figure 5D:
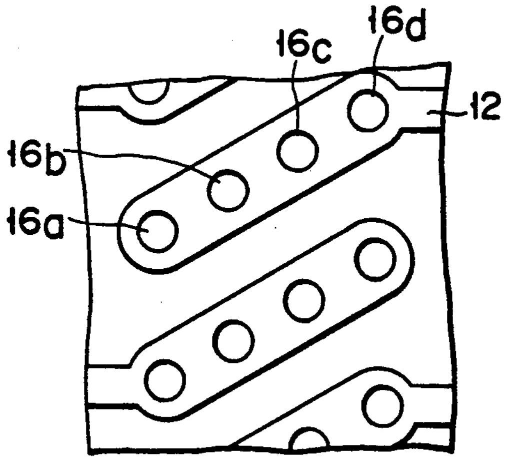
FIG. 5D is a plan view showing an arrangement of segment electrode areas in a first matrix electrode of the ion current control head in FIG. 5A.

Insulating layers (14, 15) are each formed between the associated ones of the respective electrodes 11, 12 and 13 to provide a compact unit as shown in FIG. 5A. As openings 16, there are provided larger openings 16A to 16D and smaller openings 16*a* to 16*d*, that is, the larger openings are provided in the electrode 11 and insulating layer 14 and the smaller openings in the electrodes 12 and 13 and insulating layer 15.

In FIG. 5A, E1, E2 and E3 show the equipotential planes; F2, the maximally ion-trappable zone in the respective embodiment; f2, the path of the ion current at that time, F1, an ion-trappable zone in the third embodiment; and F1, the path of the ion current at that time. The cross-section in FIG. 5A is taken along line X—X' and shows the series of openings provided in a direction oblique to the sub-scanning direction—see FIG. 5B.

In the arrangement shown in the third embodiment, a voltage for trapping the ion current in the opening 16 is applied across the electrode 11 and the second matrix electrode 13. The second matrix electrode 13 has its openings adjacently arranged in the main scanning direction. The ion current trapping voltage is sequentially applied relative to only a selected opening in which case the ion-suppressing voltage is applied relative to the remaining openings.

Under the voltage application conditions as set out above, a convex lens-like plane is defined over the ion trapping opening 16b as indicated by the equipotential planes E1, E2 and E3 of solid lines and concave lens-like zones are created over the openings 16a and 16b. That is, the convex lens-like equipotential planes E1, E2 and E3 are curved gradually in the direction away from the corresponding opening and become greater with the ion trapping opening 16b as a center to allow an entrance of some ion current into this opening from those adjacent zones where ion current is also equally allotted. In FIG. 5A, F1 shows the path of ion current to be trapped and F1, the width of the ion trappable zone. Therefore, more ion current can be trapped in the corresponding opening.

Upon comparison with the first and second embodiments, the intermediate electrode will be explained as being the first matrix electrode 12. In the case where a solid-black image is to be printed on the recording medium with an image signal applied to the first matrix electrode 12, a voltage for trapping ion current is applied to the corresponding electrodes. As a result, the equipotential plane is created over each opening and the equipotential plane away from the electrode 11 as indicated by E2 in FIG. 5A provides a gradual convex lens-like profile and the ion current to be trapped in the opening is not supplied from other than the zone equally allotted to the respective opening.

According to the third embodiment of the present invention, more ion current can be trapped in the opening.

Figure 6:
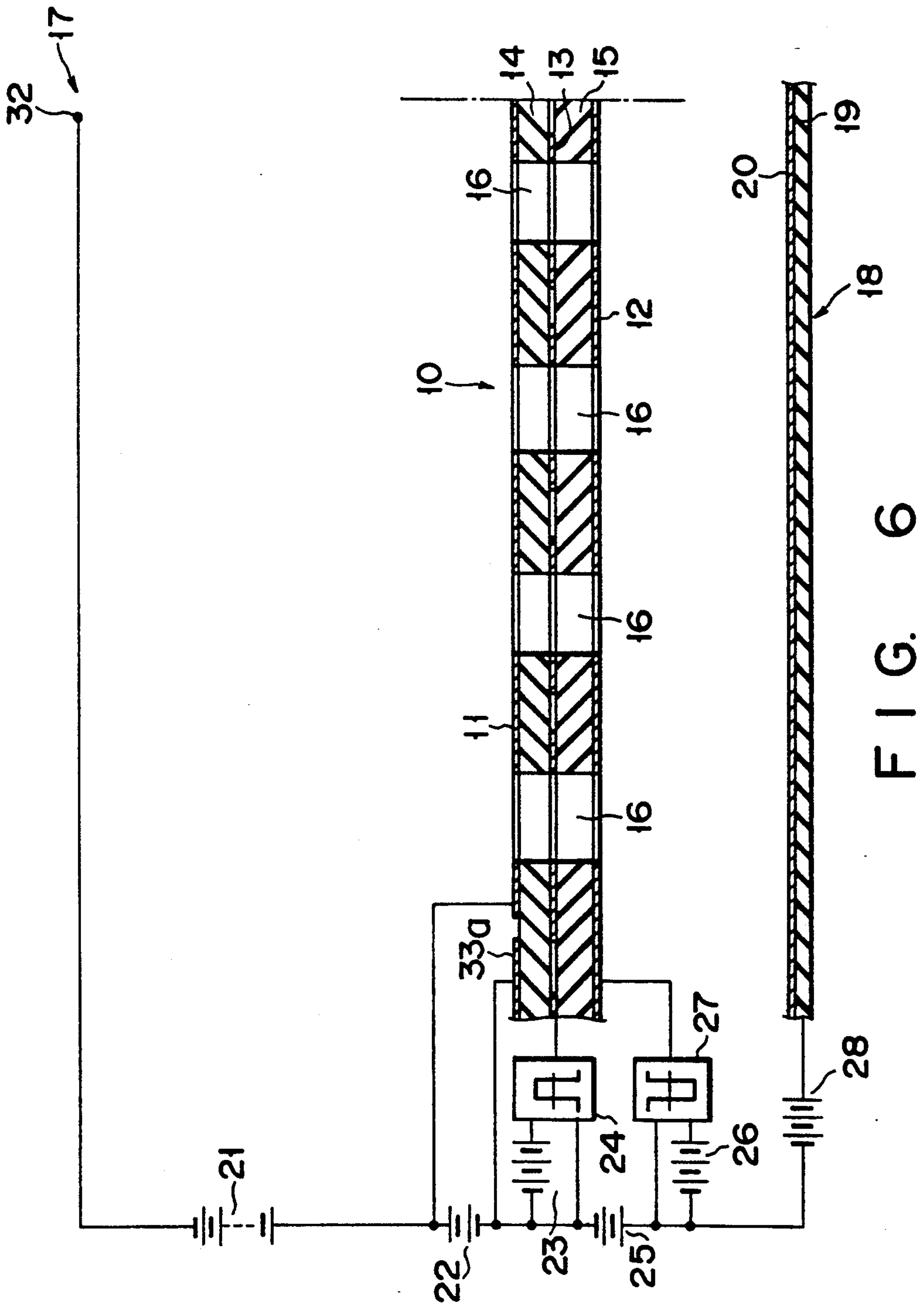
FIG. 6 is a cross-sectional view schematically showing an ion current control head according to a fourth embodiment of the present invention as well as an electrostatic recording apparatus for that head.
Figure 7A:
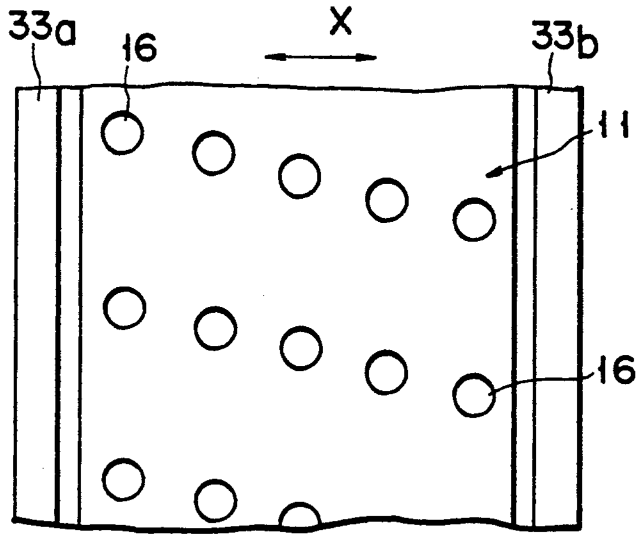
FIG. 7A is a plan view showing an electrode in the ion current control head.
Figure 7B:
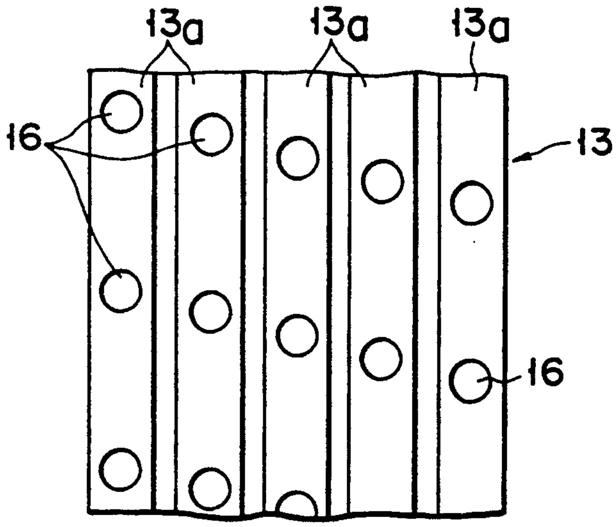
FIG. 7B is a plan view showing a second matrix electrode in the ion current control head.
Figure 7C:
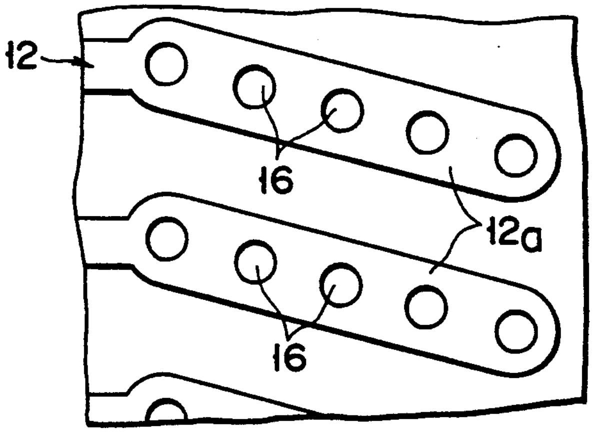
FIG. 7C is a plan view showing a first matrix electrode in the ion current control head.

FIGS. 6 to 8 show a fourth embodiment of the present invention. In FIG. 6, reference numeral 10 shows an ion current control head; 11, a third electrode (undivided continuous layer); 12, a second electrode (segmented electrode layer); and 13, a second electrode (segmented electrode layer). Insulating layers (14, 15) are formed one between the electrodes 11 and 13 and one between the electrodes 13 and 12 to provide a laminated structure. As shown in FIGS. 7A to 7B, band-like isolation electrodes 33a, 33b are provided one at each end of the third electrode 11 in a longitudinal direction along which those segment electrode areas 12a in the second electrode 13 are arranged. As shown in FIG. 6, the isolation electrodes 33a, 33b are connected to a negative terminal of a suppression field power source 22. A voltage of ion repulsive polarity is applied to the isolation electrodes 33a and 33b adjacent to the third electrode 11 with a potential on the electrode 11 as a reference.

The ion current control head 10 provides an integral laminated structure comprising electrodes 11, 12 and 13 and insulating layers 14 and 15. The electrode 11 is so arranged as to face an ion source 17. The electrode 11 is of such a type that, as shown in a plan view in FIG. 7A, it is undivided and continuous except for only those ion passage openings 16. The respective openings 16 are arranged in such a two-dimensional matrix array as set out in the case of the preceding embodiment. The isolation electrodes 33a, 33b are provided, as band-like ones, along the main scanning direction at those areas adjacent to both ends of the electrode 11, that is, those ends of the electrode 11 as viewed in the sub-scanning direction (direction of an arrow X).

The first electrode 12 is divided into a plurality of segment electrode areas 12a. As shown in FIG. 7, the respective segment electrode areas 12a have their openings 16 provided in a direction oblique to the sub-scanning direction and are separated in the main scanning direction.

The second electrode 13 is divided into a plurality of segment electrode area. The segment electrode areas have a series of openings 16 provided in the main scanning direction and are separated from each other in the sub-scanning direction.

The advantage of the ion current control head 10, including that of the isolation electrodes 33a, 33b, will be explained below with reference to FIGS. 3A to 3B.

Figure 8A:
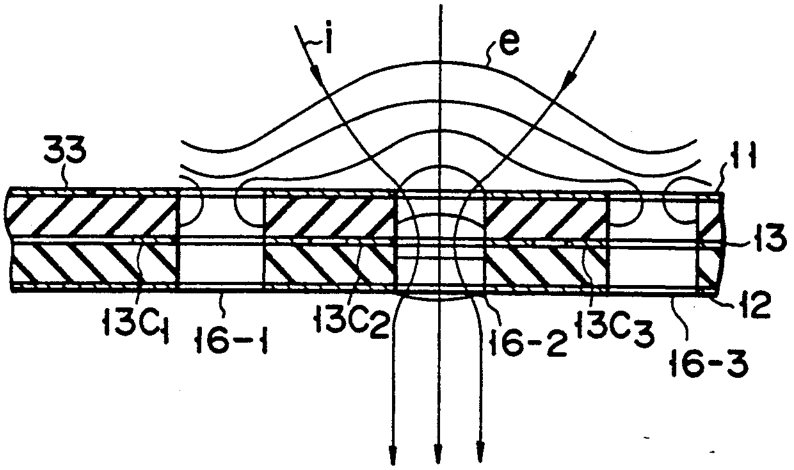
FIGS. 8A to 8B, each, show an ion current control head according to a fifth embodiment of the present invention as well as the state of an electric field applied and ion current involved.

In FIG. 8A, $13C_2$ shows a first segment electrode area at a first row in the sub-scanning direction in the second electrode 13 and $13C_2$ and $13C_3$ show those segment electrode areas in second and third rows sequentially arranged toward the center area and there are first to third openings 16-1, 16-2 and 16-3 correspondingly. In FIG. 8, e shows an equipotential line and i shows the path of the ion current.

Here, FIG. 8 shows a case where a potential, for example, +150V, for trapping ion current in the opening 16-2 is applied to the second segment electrode area $13C_2$ and −100V is applied to the segment electrode areas $13C_1$ and $13C_3$. A convex lens-like equipotential line for trapping the ion current is created over the opening 16-2 on the ion source 17 side. A concave lens-like equipotential line for suppressing ion current is created over the openings 16-1 and 16-3 adjacent the opening 16-2.

The concave lens-like equipotential line influences the convex lens-like equipotential line, making the curve of the convex lens-like equipotential line greater and hence enlarging that zone. As a result, a broader ion current is trapped in the control opening 16-2 as indicated by i in FIG. 8A.

Figure 8B:
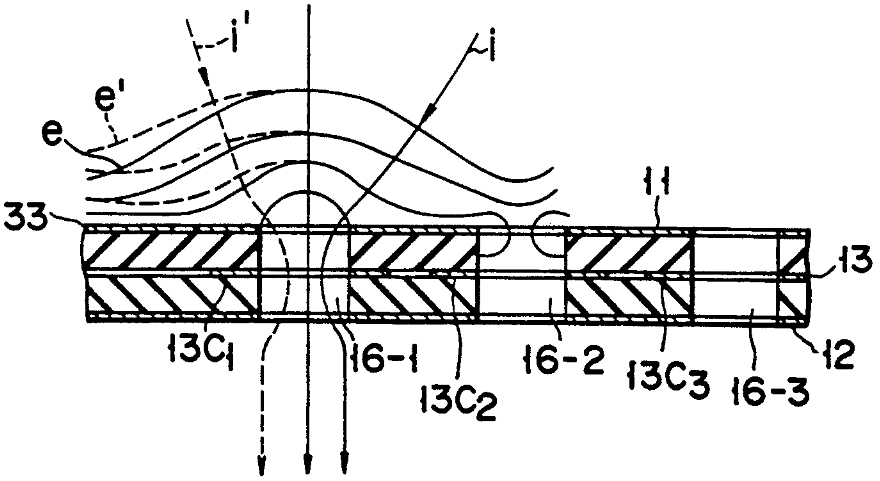
Figure 9:
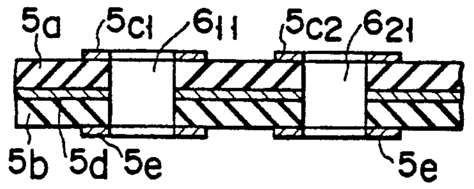
FIG. 9 (PRIOR ART)
FIG. 9 is a longitudinal cross-section showing a conventional ion current control head.
Figure 10A:
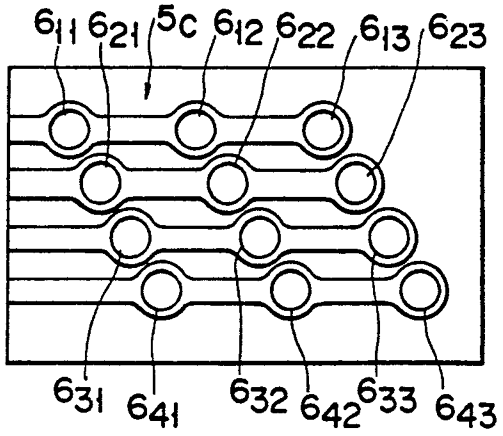
FIG. 10A (PRIOR ART)
FIG. 10A is a plan view showing an arrangement of segment electrode areas in a first matrix electrode of the conventional ion current control head.
Figure 10B:
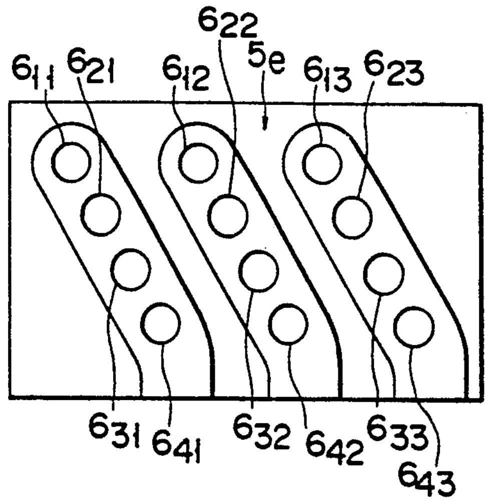
FIG. 10B (PRIOR ART)
FIG. 10B is a plan view showing an arrangement of segment electrode areas in a second matrix electrode of the conventional ion current control head.

FIG. 8B shows the case where an ion trapping potential is applied to only the outermost segment electrode $11C_1$ as viewed in the sub-scanning direction. In FIG. 8B, e' shows an equipotential line in the case where no isolation electrode 33 is provided; e, an equipotential line in the case where an ion repulsive potential, for example, −100V, is applied to the isolation electrode 33; and i, the path of the ion current corresponding to e'.

Since, to the right of the opening 16-1, the opening 16-2 is placed in an ion-suppressed state, an ion trapping zone is enlarged over the opening 16-1 as indicated by i in FIG. 8B.

In the case where no isolation electrode 33 is provided to the left side of the opening 16-1, the curve of the convex lens-like equipotential line as indicated by an equipotential line e' in FIG. 8B is not enlarged and hence only an ion current from a narrower zone indicated by i' in FIG. 8B will be trapped in the opening 16-1.

In the case where a potential of an ion repulsive direction, for example, −100V is applied to the isolation electrode 33, the curve of the convex lens-like equipotential line is made greater to provide a greater zone. The equipotential line is so varied as indicated by e in FIG. 8B, enabling more ion current to be trapped in the opening 16-1.

The function of the isolation electrode 33 basically compensates for a lack of the lens-like field enhancing field function on one side of the outermost side opening 16-1. Since, however, there is a tendency that the density of the ion current from the ion source toward the control opening is lowered away from a position beneath the corona wire 32, it is desired that, in order to compensate for that lowering, a repulsion potential be increased in the repulsion direction.

Although a detailed explanation has been made about the respective embodiment, the insulating layer used is to space the respective electrode away from the adjacent electrode and has no direct relevancy to the control of the ion current. It is not necessarily required that the openings of the insulating layer be made the same in size as those of the electrodes and provided separate from each other. For example, the size of the openings in the insulating layer may be made larger than those of the electrodes and, in this case, slit-like openings may be provided over a plurality of openings of the electrode.

According to the present invention, as set out above, that electrode on the ion generation source side is adopted as the screen electrode, decreasing an influence on the electrode's surface potential by an ion passage allowing field and suppression field in the ion passage openings. The ion current-suppressed opening adjacent the opening relative to which a control signal for trapping iron current is applied prevents a decrease in an amount of ion trapped in that opening under a given condition and allows more ion current to be trapped in that opening.

According to the present invention, it is possible to increase an amount of ion to be trapped without lowering the withstand voltage on the adjacent matrix electrodes and a desired control function is obtained by lowering the control voltage applied to the matrix electrode.

According to the present invention, in the case where each opening is to be controlled under the condition that ion current is passed, an ion trapping zone can be more largely defined than a zone equally allotted over each opening and more ion current can be trapped there.

According to the present invention, an ion trapping zone over each opening can be made greater than an ion trapping zone equally allotted over the respective opening and, when an electrode which is located at an end as viewed in the sub-scanning direction is selected, a decrease in that greater ion-trappable zone can be prevented and more ion current can be trapped throughout a whole matrix electrode range.

Additional advantages and modifications will readily occur to those skilled in the art. Therefore, the invention in its broader aspects is not limited to the specific details, and representative device shown and described herein. Accordingly, various modifications may be made without departing from the spirit or scope of the general inventive concept as defined by the appended claims and their equivalents.

What is claimed is:

1. An ion current control head for controlling ion current flying from an ion generation source to provide a pattern of charges on a dielectric medium through openings is arranged in a two-dimensional matrix array in a main scanning direction and a sub-scanning direction intersecting the main scanning direction, comprising:

(a) first electrically insulating means;

(b) first electrode means having a plurality of band-like segment electrodes arranged, as a parallel array, on a first plane along a first direction, and supported by the first electrically insulating means;

(c) second electrode means having a plurality of band-like segment electrodes arranged, as a parallel array, on, a second plane spaced from the first electrode means in a direction to or from which the ion current flies, the band-like segment electrodes being arranged along a second direction different from the first direction and supported by the first, electrically insulating means;

(d) second electrically insulating means;

(e) a third electrode means having an undivided continuous electrode separated by the second, electrically insulating means from the, first and second electrode means in the direction to or from which the ion current flies, the third electrode being located on the ion generation source side as viewed from the first and second electrodes so that it faces the ion generation source;

(f) ion current passage means having openings, each of the openings being located at those intersections of the segment electrodes in the first electrode means and the segment electrodes in the second electrode means, the openings piercing the first, second and third electrode means and being arranged as a two-dimension matrix relative to the main scanning direction and sub-scanning direction; and (g) control means for applying a first signal voltage across the third electrode means and one of the adjacent electrode means to control whether the ion current is flowed into the opening or suppressed relative to that opening and applying a second signal voltage across the segment electrode selected by the first electrode means and the segment electrode selected by the second electrode means to control whether ion current trapped in a corresponding opening is allowed to be passed or suppressed and for performing a matrix drive operation by the signal voltage applied to the respective electrode so that the ion current can be controlled.

2. The ion current control head according to claim 1, wherein the openings of the ion current passage means are comprised of larger openings provided in the third electrode facing the ion generation source and in the second insulating means for supporting the third electrode and smaller openings provided in the first and second electrodes and in the first insulating means.

3. The ion current control head according to claim 1, wherein each of the segment electrodes of the second electrode means has openings arranged in the main scanning direction, and the first electrode means is located on that side opposite to that on which the third electrode means is located with the second electrode means therebetween, each of the segment electrodes of the first electrode means having their openings arranged in that direction oblique or parallel to the sub-scanning direction.

4. The ion current control head according to claim 3, further comprising band-like isolation electrode means provided adjacent the outermost openings in a manner to be separated from the third electrode means and means provided for applying a voltage of an ion repulsive polarity with a potential on the third electrode means as a reference.

* * * * *

UNITED STATES PATENT AND TRADEMARK OFFICE
CERTIFICATE OF CORRECTION

PATENT NO. : 5,206,670

DATED : April 27, 1993

INVENTOR(S) : Masaji NISHIKAWA

It is certified that error appears in the above-identified patent and that said Letters Patent is hereby corrected as shown below:

On the title page, item [57] Abstract:

line 14, "lor" should be --or--.

Signed and Sealed this

Sixth Day of September, 1994

Attest:

BRUCE LEHMAN

Attesting Officer

Commissioner of Patents and Trademarks